United States Patent
Grant et al.

(10) Patent No.: US 12,556,336 B2
(45) Date of Patent: Feb. 17, 2026

(54) MULTI-SLOT REFERENCE SIGNAL TRIGGERING USING REFERENCE SIGNAL IDENTITIES

(71) Applicant: Telefonaktiebolaget LM Ericsson (publ), Stockholm (SE)

(72) Inventors: Stephen Grant, Pleasanton, CA (US); Jung-Fu Cheng, Fremont, CA (US); Reem Karaki, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 289 days.

(21) Appl. No.: 18/249,133

(22) PCT Filed: Oct. 12, 2021

(86) PCT No.: PCT/EP2021/078216
§ 371 (c)(1),
(2) Date: Apr. 14, 2023

(87) PCT Pub. No.: WO2022/079048
PCT Pub. Date: Apr. 21, 2022

(65) Prior Publication Data
US 2024/0063968 A1 Feb. 22, 2024

Related U.S. Application Data

(60) Provisional application No. 63/092,908, filed on Oct. 16, 2020.

(51) Int. Cl.
*H04L 5/00* (2006.01)
*H04B 7/06* (2006.01)
(Continued)

(52) U.S. Cl.
CPC ......... *H04L 5/0051* (2013.01); *H04B 7/0626* (2013.01); *H04L 5/0094* (2013.01);
(Continued)

(58) Field of Classification Search
None
See application file for complete search history.

(56) References Cited

U.S. PATENT DOCUMENTS 10,841,059 B2 * 11/2020 Park .................... H04L 27/2607
2019/0268053 A1 * 8/2019 John Wilson ........ H04B 7/0695
(Continued)

FOREIGN PATENT DOCUMENTS

| CN | 107925448 A | 4/2018 |
|---|---|---|
| CN | 109792356 A | 5/2019 |

(Continued)

OTHER PUBLICATIONS

International Search Report and Written Opinion dated Jan. 19, 2022 for International Application No. PCT/EP2021/078216 filed Oct. 12, 2021, consisting of 10-pages.
(Continued)

*Primary Examiner* — Otis L Thompson, Jr.
(74) *Attorney, Agent, or Firm* — Weisberg I.P. Law, P.A.

(57) ABSTRACT

A network node is configured to communicate with a wireless device. The network node includes a radio interface and processing circuitry configured to transmit a configuration of a set of reference signals via RRC signaling to the wireless device. The radio interface and processing circuitry are further configured to transmit a downlink control information, DCI, that triggers the set of reference signals in multiple slots to the wireless device, where each set of reference signal is confined to OFDM symbols within a slot. In some embodiments, the DCI includes a field which indicates a reference signal set combination ID. In further embodiments the reference signal set combination ID indicates a list of RS set IDs. A method for a network node, a wireless device and a method for a wireless device are also provided.

19 Claims, 7 Drawing Sheets

(51) Int. Cl.
  *H04W 72/0446* (2023.01)
  *H04W 72/232* (2023.01)
  *H04W 76/20* (2018.01)

(52) U.S. Cl.
  CPC ..... *H04W 72/0446* (2013.01); *H04W 72/232* (2023.01); *H04W 76/20* (2018.02); *H04L 5/0007* (2013.01)

(56) References Cited

U.S. PATENT DOCUMENTS

| | | | | |
|---|---|---|---|---|
| 2020/0314817 | A1* | 10/2020 | Sun | H04W 72/23 |
| 2020/0351055 | A1* | 11/2020 | Manolakos | H04B 7/088 |
| 2020/0351129 | A1* | 11/2020 | Kwak | H04W 72/53 |
| 2020/0367217 | A1* | 11/2020 | Wang | H04L 5/0094 |
| 2020/0382253 | A1* | 12/2020 | Manolakos | H04W 72/23 |
| 2021/0083824 | A1* | 3/2021 | Wernersson | H04L 5/0051 |
| 2021/0105090 | A1* | 4/2021 | Park | H04W 80/02 |
| 2021/0167821 | A1* | 6/2021 | Chen | H04B 7/0617 |
| 2021/0329619 | A1* | 10/2021 | Raghavan | H04B 7/0695 |
| 2023/0033910 | A1* | 2/2023 | Khoshnevisan | H04L 5/0048 |
| 2023/0396385 | A1* | 12/2023 | Kwak | H04L 5/0094 |

FOREIGN PATENT DOCUMENTS

| | | |
|---|---|---|
| CN | 109923828 A | 6/2019 |
| EP | 3565162 A1 | 11/2019 |

OTHER PUBLICATIONS

3GPP TSG RAN WG1 #102-e R1-2005487; Title: Discussion on SRS Enhancements; Agenda Item: 8.1.3; Source: InterDigital, Inc.; Document for: Discussion and Decision; Date and Location: Aug. 17-28, 2020, e-Meeting, consisting of 5-pages.

3GPP TSG-RAN WG1 Meeting #102-e R1-2006795; Title: Enhancements on SRS flexibility, switching, coverage and capacity; Agenda Item: 8.1.3; Source: Qualcomm Incorporated; Document for: Discussion/Decision; Date and Location: Aug. 17-28, 2020, e-Meeting, consisting of 27-pages.

Chinese Office Action and English machine translation dated Sep. 20, 2025 for Application No. 202180071079.5, consisting of 16 pages.

* cited by examiner

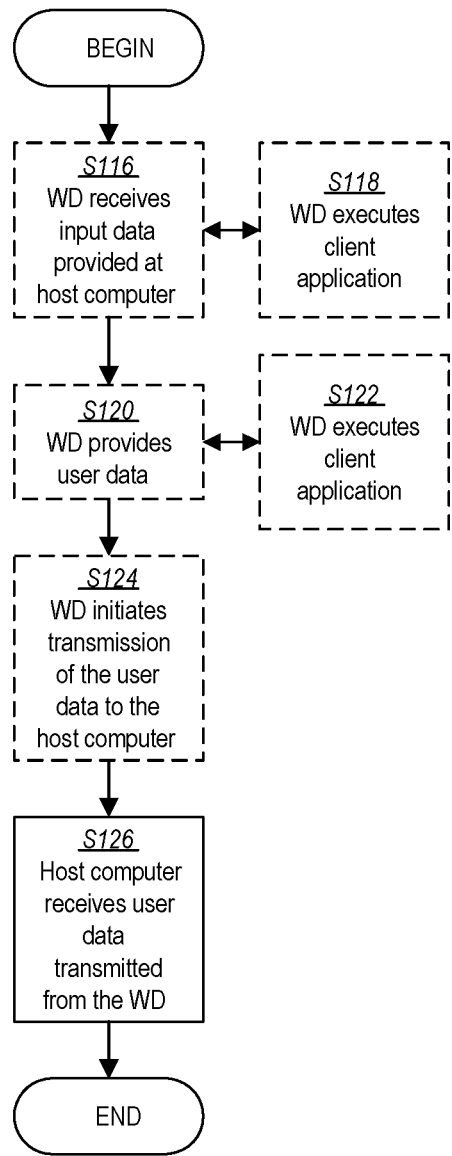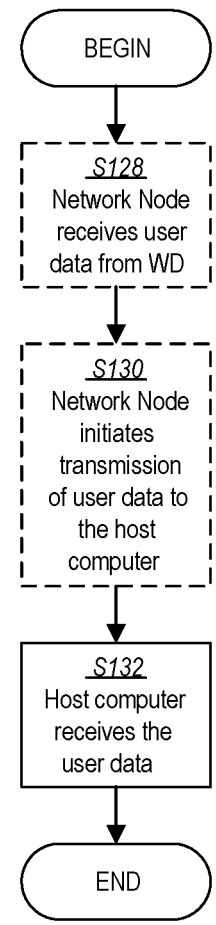
FIG. 7
FIG. 8

MULTI-SLOT REFERENCE SIGNAL TRIGGERING USING REFERENCE SIGNAL IDENTITIES

CROSS-REFERENCE TO RELATED APPLICATIONS

This application is a Submission Under 35 U.S.C. § 371 for U.S. National Stage Patent Application of International Application No.: PCT/EP2021/078216, filed Oct. 12, 2021 entitled "MULTI-SLOT REFERENCE SIGNAL TRIGGERING USING REFERENCE SIGNAL IDENTITIES," which claims priority to U.S. Provisional Application No.: 63/092,908, filed Oct. 16, 2020, the entireties of both of which are incorporated herein by reference.

FIELD

The present disclosure relates to wireless communications, and in particular, to multi-slot reference signal (RS) triggering using reference signal identities.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

NR supports periodic, semi-persistent, and aperiodic reference signals, e.g., channel-state information reference signal (CSI-RS) in the downlink and sounding reference singal (SRS) in the uplink. One or more reference signal (RS) sets are configured to the WD, where an RS set contains one or more CSI-RS/SRS resources. An individual CSI-RS/SRS resource occupies N orthogonal frequency division multiplex (OFDM) symbols within a single slot where in 3GPP Technical Release 16 (Rel-16), N can be 1, 2, or 4 for both CSI-RS and SRS. For a CSI-RS resource, the starting symbol index within the slot for the first OFDM symbol of the resource is indicated by the radio resource control (RRC) parameter, firstOFDMSymbolInTimeDomain, within CSI-RS-ResourceMapping and can take a value {0 . . . 13}. For an SRS resource, the starting symbol index within the slot for the first OFDM symbol of the resource is indicated by the RRC parameter, startPosition-r16, within SRS-Config and can take a value {0 . . . 13}.

This disclosure relates to the case of aperiodic RS sets where the RS sets are configured by RRC and an RS set is triggered (scheduled) by a particular downlink control information (DCI) message contained in a physical downlink control channel (PDCCH) detected by the WD. In all but one special case (aperiodic SRS resources used for the purpose of channel sounding with 1T4R antenna switching) the resources within a single aperiodic RS set are contained entirely within a single slot. For the special case of an aperiodic SRSs for 1T4R antenna switching, the RS set contains 4 resources and they are configured to occupy 2 strictly adjacent slots.

FIG. 1 is an example of an RS set containing 4 single symbol (N=1) aperiodic CSI-RS resources occupying OFDM symbols 5, 6, 7, and 8, respectively. These CSI-RS resources may be used, for example, for the purposes of beam management. In this example, the network node, e.g., NR base station (gNB), applies different spatial domain transmit filters (beamforming weights) to each different CSI-RS resource in the form of a beam sweep. The WD can then measure the reference signal received power (RSRP) corresponding to each different CSI-RS resource within the set and report back an identity of the CSI-RS resource with the largest RSRP as well as the measured RSRP itself. The WD can also be configured to report the identities of the CSI-RS resources with the top-L largest RSRPs in the set as well as the RSRPs themselves. This enables the network node, e.g., gNB to make decisions about what is the best beam to use to subsequently schedule the WD for data transmissions.

For CSI-RS, in 3GPP Rel-16, a single DCI can trigger multiple reporting configurations, where each reporting configuration corresponds to a single CSI-RS resource set located within a single slot. Hence, an individual CSI report is based on RS resources within only one slot (maximum 14 CSI-RS resources). It is not possible to trigger CSI-RS resources in multiple slots and configure the WD to prepare a single CSI report based on a super set of CSI-RS resources in the multiple slots. This is important for the 52.6-71 GHz band where it is expected that a large number of beams (and thus a large number of CSI-RS resources) will be used to overcome link budget limitations when operating at such high frequencies.

For SRS, while it is possible to trigger multiple SRS resource sets in the same or different slots with a single DCI in 3GPP Rel-16, the configuration and triggering mechanism is inflexible. 3GPP Rel-16 limits this functionality only to SRS resource sets configured for the purposes of beam management. SRS configured for other purposes (e.g., codebook/non-codebook based precoding, channel sounding for DL CSI acquisition, etc.) is limited to configuration of just 1 or 2 SRS resource sets. Considering that there are only 3 available codepoints in the SRS request field, there are severe limitations on how SRS for beam management may be configured and triggered when SRS is configured to support multiple use cases. There may only be 1 or 2 codepoints available for triggering SRS for beam management. This puts limitations on the number of combinations of SRS resource sets (potentially with different slots offsets) that can be triggered over multiple slots. Moreover, in unlicensed operation, a fixed time division duplex (TDD) uplink/downlink (UL/DL) pattern is typically not configured, and thus it is not predictable ahead of time which slots are to be used for UL and DL. Having rigid RRC configurations of a very limited number of combinations of slot offsets for SRS resource sets does not interoperate well with unlicensed operation where UL/DL patterns are more dynamic.

For 52.6-71 GHz band being specified in 3GPP Rel-17, a large subcarrier spacing compared to 3GPP Rel-15 will be supported, e.g., 480 or 960 kHz. This is compared to 3GPP Rel-16 where the largest SCS supported is 120 kHz. Hence, the slot duration will be 4 or 8 times shorter than in 3GPP Rel-16. Because of this, it is unlikely that WDs will be configured to monitor for PDCCH (triggering CSI-RS/SRS) in every slot due to processing time/power constraints. This limits triggering of RS resources to be on the periodicity of the PDCCH monitoring, and makes multi-slot triggering more important.

SUMMARY

In one embodiment there is provided a network node. The network node being configured to communicate with a wireless device. The network node includes a radio interface and processing circuitry configured to transmit a configuration of sets of reference signals via RRC signaling to the wireless device. The radio interface and processing circuitry are further configured to transmit a downlink control information, DCI, that triggers the set of reference signals in multiple slots to the wireless device, where each set of reference signal is confined to OFDM symbols within a slot.

In another embodiment there is provided a method implemented in a network node. The network node being configured to communicate with a wireless device. The method includes transmitting a configuration of sets of reference signals via RRC signaling to the wireless device. The method further includes transmitting a downlink control information, DCI, that triggers the set of reference signals in multiple slots to the wireless device, where each set of reference signal is confined to OFDM symbols within a slot.

In another embodiment there is provided a wireless device. The wireless device being configured to communicate with a network node. The wireless device includes a radio interface and processing circuitry configured to receive a configuration of sets of reference signals via RRC signaling from the network node. The radio interface and processing circuitry further configured to receive a triggering of the set of reference signals via a downlink control information, DCI, from the network node, where the DCI triggers reference signal in multiple slots. Furthermore, the radio interface and processing circuitry being configured to transmit or receive the set of reference signals in multiple slots as indicated by the information received from the network node, where each set of reference signal is confined to OFDM symbols within a slot.

In another embodiment there is provided a method for a wireless device. The wireless device being configured to communicate with a network node. The method includes receiving a configuration of a set of reference signals via RRC signaling from the network node. The method further includes receiving a trigger of the set of reference signals via a downlink control information, DCI. Finally, the method includes at least one of transmitting or receiving the set of reference signals in multiple slots as indicated by the information received from the network node, where each set of reference signal is confined to OFDM symbols within a slot.

In some embodiments, the DCI includes a field which indicates a reference signal set combination ID. The reference signal set combination ID identifies a combination of sets of reference signals.

In some embodiments the combination of the set of reference signals is identified using identities, RS set IDs. The RS set IDs identifies the sets of reference signals in the combination of the set of reference signal.

In further embodiments the reference signal set combination ID indicates a list of RS set IDs.

Some embodiments advantageously provide methods, systems, and apparatuses for multi-slot reference signal triggering. For efficient operation in the 52.6-71 GHz band, there is a need to have more flexible mechanisms to configure and trigger aperiodic CSI-RS/SRS resources with a single DCI over multiple slots.

For 52.6-71 GHz band being specified in Rel-17, a large subcarrier spacing compared to Rel-15 will be supported, e.g., 480 or 960 kHz. This is compared to Rel-16 where the largest SCS supported is 120 kHz. Hence, the slot duration will be 4 or 8 times shorter than in Rel-16. Because of this, it is unlikely that UEs will be configured to monitor for PDCCH (triggering CSI-RS/SRS) in every slot due to processing time/power constraints. This limits the triggering of RS resources to be on the periodicity of the PDCCH monitoring, and makes multi-slot triggering more important.

Thus several methods for achieving flexibility in configuring and triggering reference signal resources (e.g., CSI-RS, SRS) in multiple slots using a single DCI are disclosed herein.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart illustrating exemplary methods implemented in a communication system including a host computer, a network node and a wireless device for receiving user data from the wireless device at a host computer according to some embodiments of the present disclosure;

FIG. 8 is a flowchart illustrating exemplary methods implemented in a communication system including a host computer, a network node and a wireless device for receiving user data at a host computer according to some embodiments of the present disclosure;

DETAILED DESCRIPTION

Figure 1:
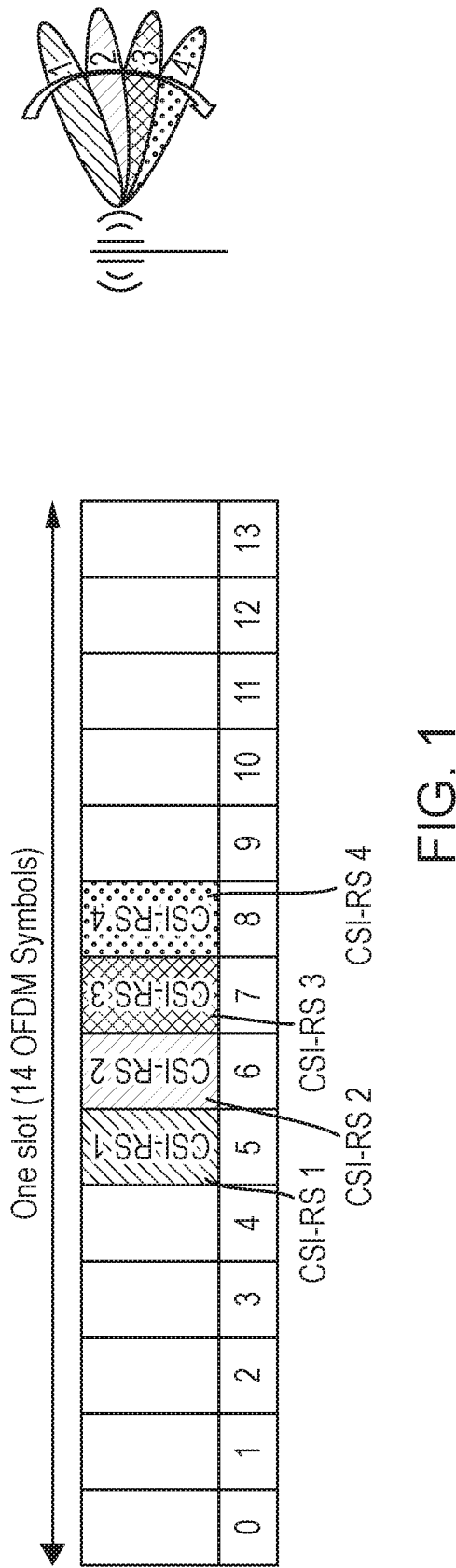
FIG. 1 is an example of an RS set.

Before describing in detail exemplary embodiments, it is noted that the embodiments reside primarily in combinations of apparatus components and processing steps related to multi-slot reference signal triggering. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
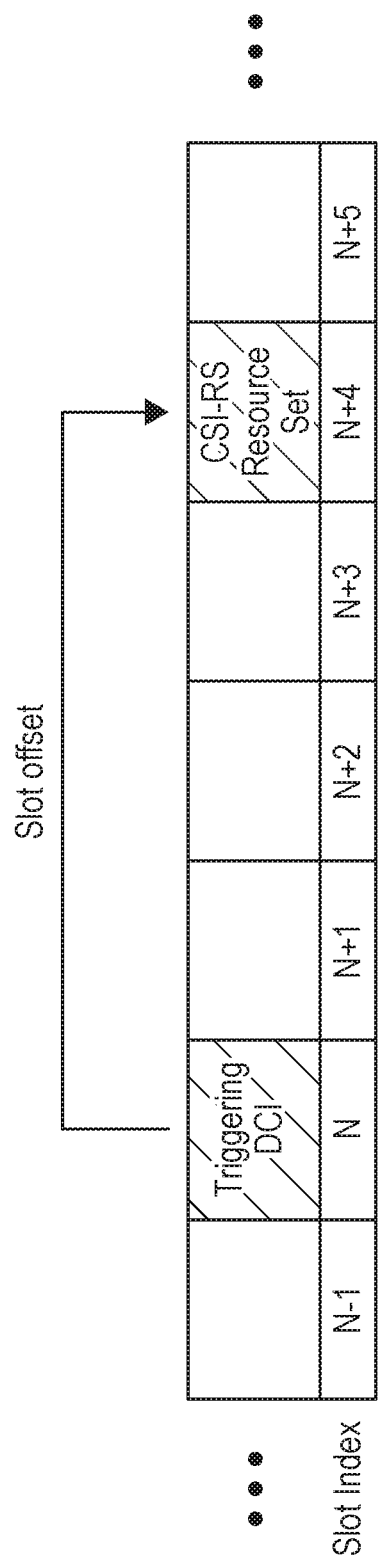
FIG. 2 is an example of timing of a CSI-RS resource set in relation to a triggering DCI.

FIG. 2 is an example of the timing of the CSI-RS resource set in relation to the triggering DCI. The RS set configuration contains an RRC parameter that specifies a slot offset which in 3GPP Rel-16 can take a value 0 . . . 16 or 24. If the WD detects a DCI message in slot N that triggers the aperiodic CSI-RS resource set, then the WD assumes that the CSI-RS resources within the set are located in slot N+K where K is the RRC configured slot offset. In FIG. 2 the slot offset is configured as K=4, for example.

For cases of CSI-RS resources sets, 3GPP Rel-16 specifies a parameter repetition that may be configured by RRC within the resource set configuration. The parameter is configured if the CSI-RS resources are to be used for the purposes of L1-RSRP or L1 signal to interference plus noise ratio (L1-SINR) reporting for beam management. If configured, the parameter repetition can take values 'on' or 'off.' If repetition='on,' it means that the WD may assumes that the CSI-RS resources in a resource set are transmitted by the gNB using the same downlink spatial domain transmission filter (i.e., transmit beam forming weights). This allows the WD to adjust its spatial domain reception filter (i.e., receive beamforming weights) when receiving each different CSI-RS resource in the set. In this way, the WD may determine the preferred spatial domain receive filter corresponding to the particular spatial domain transmit filter used by the gNB for that CSI-RS resource set. The preferred spatial domain receive filter is typically selected to maximize a particular metric across the CSI-RS resources in the set, e.g., Layer 1 reference signal receive power (L1-RSRP) or Layer 1 signal-to-interference-plus-noise ratio (L1-SINR).

Conversely, if repetition='off,' it means that the WD may NOT assume that the CSI-RS resources in resource set are transmitted by the gNB using the same downlink spatial domain transmission filter. In this case the WD would typically leave its spatial domain receive filter fixed when receiving the CSI-RS resources in the set, and the network node, e.g., gNB, would vary its spatial domain transmit filter for each CSI-RS resource in the set. Based on the L1-RSRP/L1-SINR report from the WD, the network node, e.g., gNB, determines the spatial domain transmit filter from the WD perspective.

As additional detail, the RS sets may be configured and triggered according to 3GPP Rel-16 as follows:

CSI-RS Resource Sets

The WD is RRC configured with a list of S aperiodic trigger states, where S can be up to 64:

Each trigger state is associated with a list of up to 16 CSI reporting configurations which inform the WD of the type of CSI report to prepare;

Each CSI reporting configuration is associated with a single aperiodic CSI-RS resource set out of a list of one or more CSI-RS resource sets that are configured as part of a CSI resource configuration:

Each aperiodic CSI-RS resource set contains a parameter specifying a slot offset K that may take a value 0 . . . 16 or 24;

The CSI request field of the triggering DCI message indicates a single trigger state out of the list of S trigger states, where the values of the CSI request field are mapped one-to-one in increasing order to the list of aperiodic trigger states. A particular value of the CSI request field is referred to as a DCI codepoint:

The CSI request field contains a configurable number of bits B=0 . . . 6 depending on the size of the list of aperiodic trigger states;

If the CSI request field is configured with a number of bits that is insufficient to address all L aperiodic trigger states, a medium access control element (MAC-CE) message indicates which subset of the S aperiodic trigger states are mapped to the $2^B$ DCI codepoints; and A CSI request field may be configured in DCI formats 0_1 or 0_2 (UL DCI formats) or sidelink control information (SCI) format 2-A; and With this mechanism, a single DCI can trigger multiple aperiodic CSI-RS reports; however, each CSI report is associated with only a single CSI-RS resource set SRS Resource Sets The WD is RRC configured with a number of SRS resource sets:

Each SRS resource set contains a parameter specifying a slot offset K that may take a value 1 . . . 32; and Within each SRS resource set, the WD is RRC configured with either a single aperiodic trigger state index (integer value 1 . . . 3) or a list of up to two trigger state indices;

The SRS request field of the triggering DCI message is 2-bits and indicates a single trigger state with one of 4 possible values (codepoints) {00, 01, 10, 11};

If the DCI codepoint='00', no SRS resource set is triggered; and

If the DCI codepoint is one of the values {01, 10, 11}, e.g., '11', then any SRS resource set that is RRC configured with trigger state index 3 (integer value corresponding to binary '11') is triggered.

Several methods for achieving flexibility in configuring and triggering reference signal resources (e.g., CSI-RS, SRS) in multiple slots using a single DCI are disclosed. Some advantages of some embodiments disclosed herein include:

Improved flexibility (as compared with known arrangements) for configuring and triggering reference signal resources across multiple slots which is beneficial for operation in the 52.6-71 GHz band; and/or Improved PDCCH capacity (as compared with known arrangements) by triggering reference signal resources in multiple slots with a single DCI compared to, e.g., every slot.

In the embodiments reference signal sets are triggered in multiple slots, meaning that a single DCI triggers RRC configured reference signal sets in at least two slots. The number of slots is indicated by the parameter L, which may assume the value equal to or larger than 1. In preferred embodiments the number of slots refers to at least two slots.

Figure 3:
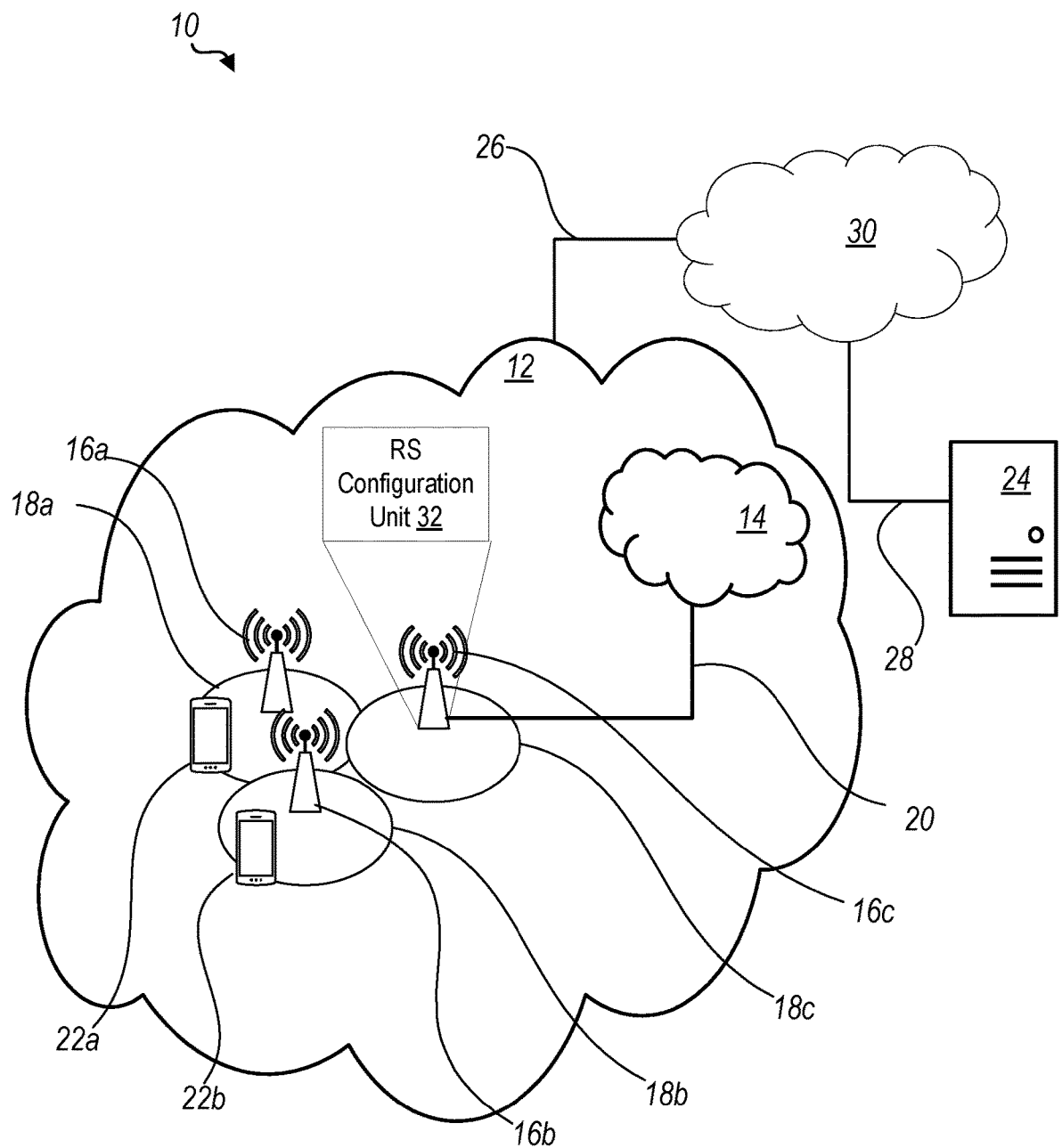
FIG. 3 is a schematic diagram of an exemplary network architecture illustrating a communication system connected via an intermediate network to a host computer according to the principles in the present disclosure.

Returning now to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an RS configuration unit 32 which is configured to configure a WD with a set of reference signals via a DCI signal. A WD 22 is configured to receive an indication of a set of reference signals in a DCI signal.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include an RS configuration unit 32 which is configured to configure a WD with a set of reference signals via a DCI signal.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers. The radio interface 82 is configured to receive an indication of a set of reference signals in a DCI signal.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 4:
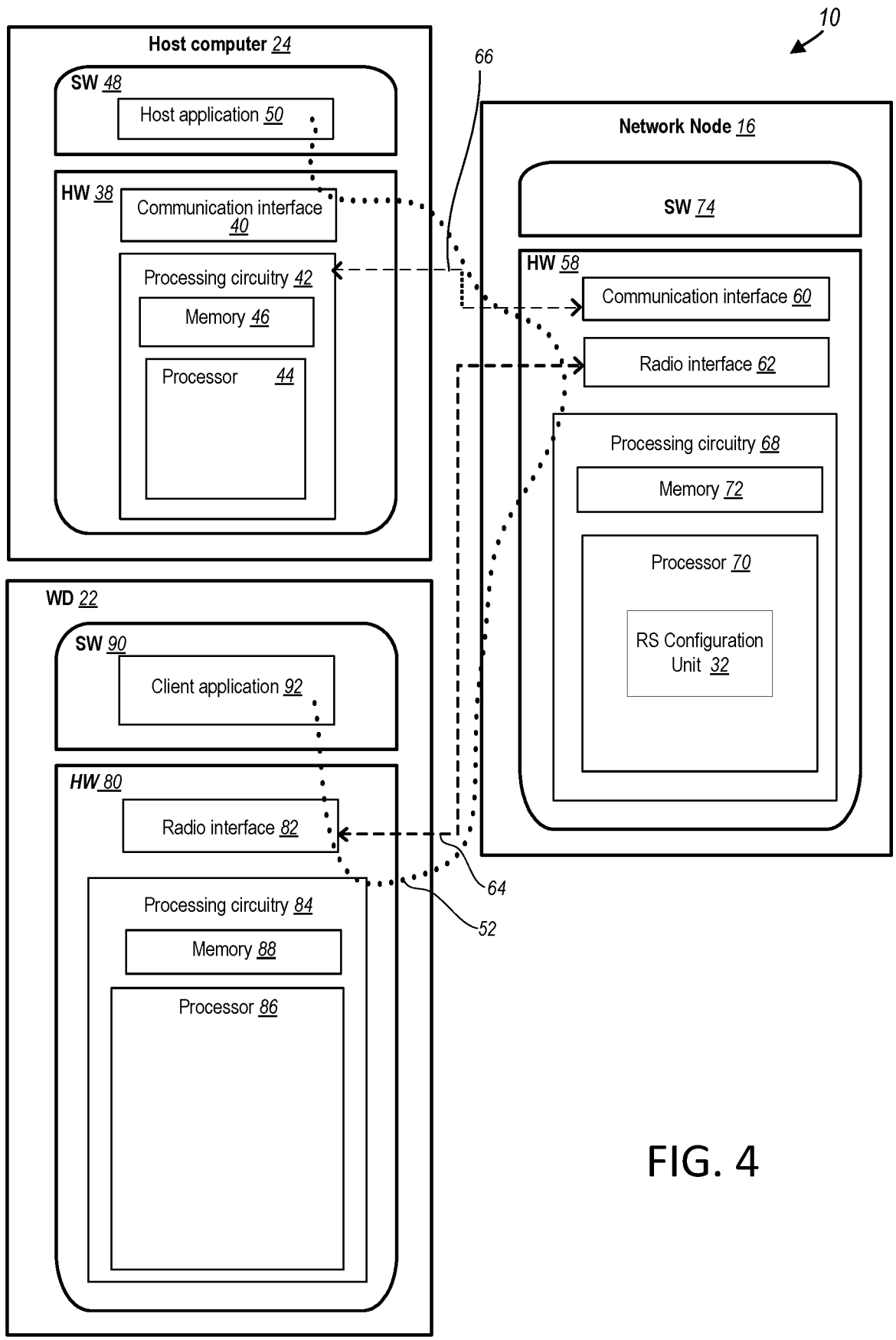
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as an RS configuration unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 5:
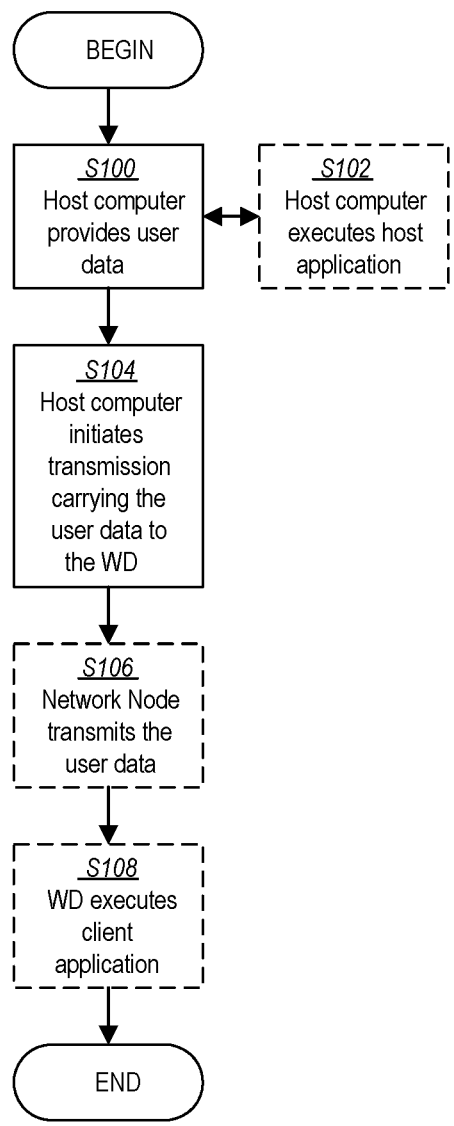
FIG. 5 is a flowchart illustrating exemplary methods implemented in a communication system including a host computer, a network node and a wireless device for executing a client application at a wireless device according to some embodiments of the present disclosure.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 6:
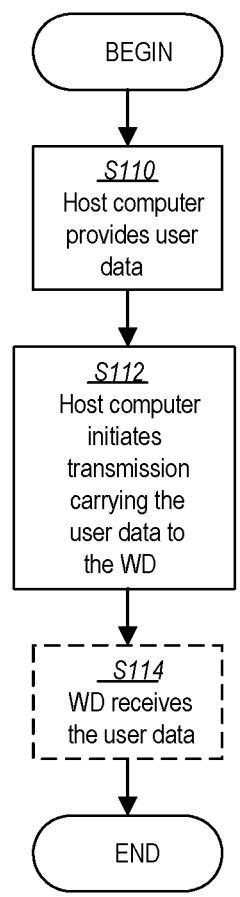
FIG. 6 is a flowchart illustrating exemplary methods implemented in a communication system including a host computer, a network node and a wireless device for receiving user data at a wireless device according to some embodiments of the present disclosure.

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
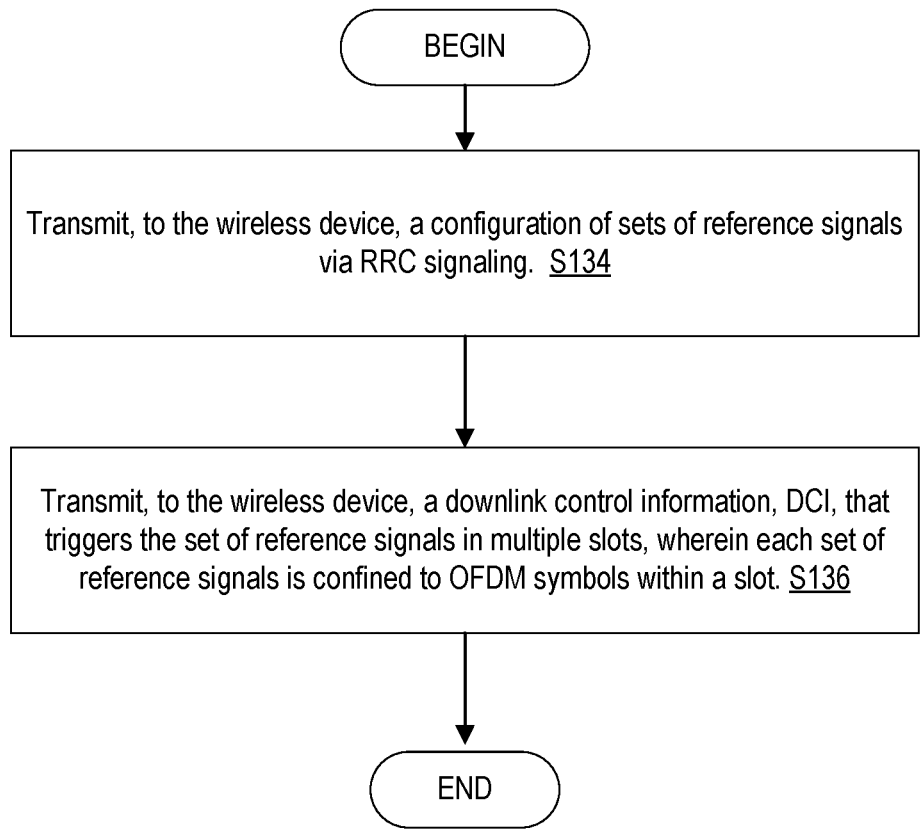
FIG. 9 is a flowchart of an exemplary process in a network node for multi-slot reference signal triggering.

FIG. 9 is a flowchart of an exemplary process in a network node 16 for multi-slot reference signal triggering. One or more blocks described herein may be performed by one or more elements of network node 16 such as by one or more of processing circuitry 68 (including the RS configuration unit 32), processor 70, radio interface 62 and/or communication interface 60. Network node 16 such as via processing circuitry 68 and/or processor 70 and/or radio interface 62 and/or communication interface 60 is configured to transmit, to the wireless device, a configuration of a set of reference signals via RRC signaling (Block S134) and to transmit, to the wireless device, a downlink control information, DCI, that triggers the set of reference signals in multiple slots (Block S136). The reference signal set may include a CSI-RS set, which is received from the network node or a SRS set which is transmitted to the network node. Each set of reference signals triggered by the DCI is confined to OFDM symbols within a slot. The DCI further includes a field which indicates combination ID, for example the DCI includes a field with at least ceil(log 2(C)) bits that is able to provide the Combination ID. The Combination ID may include a list of RS set IDs.

Figure 10:
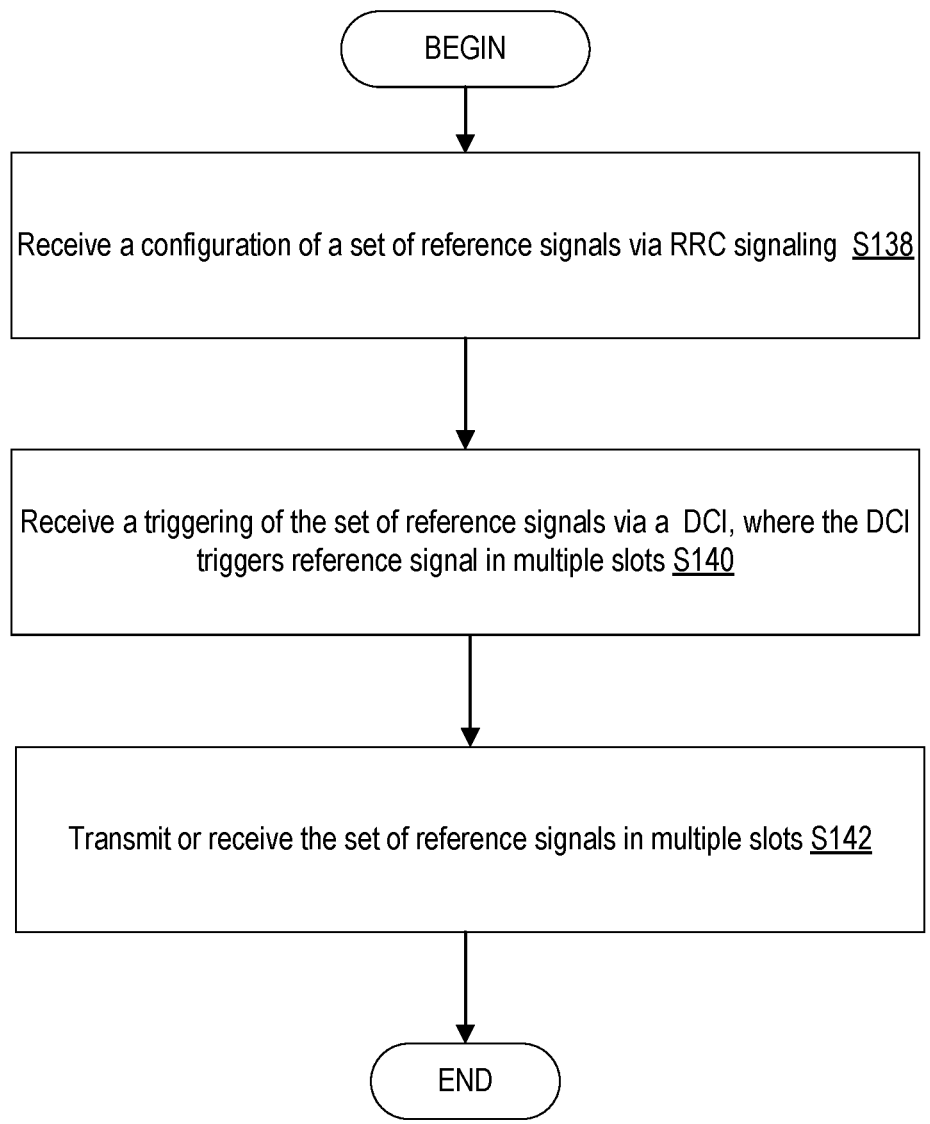
FIG. 10 is a flowchart of an exemplary process in a WD for multi-slot reference signal triggering.

FIG. 10 is a flowchart of an exemplary process in a WD for multi-slot reference signal triggering. One or more blocks described herein may be performed by one or more elements of wireless device 22 such as by one or more of processing circuitry 84, processor 86, radio interface 82 and/or communication interface 60. Wireless device 22 such as via processing circuitry 84 and/or processor 86 and/or radio interface 82 is configured to receive, from the network node, a configuration of a set of reference signals via RRC signaling (Block S138) and receive, from the network node, an triggering of indication of the set of reference signals via a downlink control information, DCI, where the DCI triggers reference signal in multiple slots (Block S140). The process also includes transmitting or receiving the set of reference signals in multiple slots as indicated by the information received from the network node (Block S142). The information received from the network node may include for example the received DCI and/or the received RRC signaling. In an exemplary embodiment the DCI triggers the wireless device to receive a CSI-RS set in multiple slots based on the received RRC configurations. In another exemplary embodiment the DCI triggers the wireless device to transit SRS set to the network node based on the received RRC configurations. Each set of reference signals triggered by the DCI is confined to OFDM symbols within a slot. The DCI further includes a field which indicates combination ID, for example the DCI includes a field with at least ceil(log 2(C)) bits that is able to provide the Combination ID. The Combination ID may include a list of RS set IDs.

Having described the general process flow of arrangements of the disclosure and having provided examples of hardware and software arrangements for implementing the processes and functions of the disclosure, the sections below provide details and examples of arrangements for multi-slot reference signal triggering.

Embodiment #1 (Single Set Configured; Triggered in Multiple Contiguous Slots)

In this embodiment, the WD 22 is configured with a single RS set configured with RS resources confined to OFDM symbols within a single slot and the WD 22 receives a PDCCH in slot n containing a triggering DCI which triggers the RS set in L>=1 contiguous slots starting at slot n+K. Here, K is an RRC configured slot offset for the RS set. One of the following approaches may be used for indicating the multiple slots:
  L is RRC configured as part of the RS set configuration;
  L is indicated dynamically with a new field in DCI. The value indicated in DCI can be the value of L directly or an index to a pre-configured list of values;
  L is jointly encoded with the slot offset K into an offset-length indicator value (OLIV) and OLIV is RRC configured as part of the RS set configuration; and/or
  Same as 3 but OLIV is indicated dynamically with a new field in DCI. In this case, the RRC configured slot offset K is ignored.

In a variation of this embodiment, the RS set is transmitted on a different carrier than the one in which the triggering DCI is received.

Embodiment #2 (Single Set Configured; Triggered in Multiple Potentially Discontiguous Slots)

In a variation of Embodiment #1, the triggering DCI triggers the RS set in multiple potentially discontiguous slots starting at slot n+K. One of the following approaches is used for indicating the multiple slots:
  1. A bitmap of length L is RRC configured as part of the RS set configuration where the Most Significant Bit, MSB, or Least Significant Bit, LSB, of the bitmap corresponds to slot n+K, and each successive bit position corresponds to the subsequent slot, where a '1' (or a '0') indicates that the RS set is triggered in the corresponding slot and a '0' (or a '1') indicates that the RS set is not triggered in the corresponding slot;
  2. Same as 1, but the bitmap is indicated dynamically with a new field in DCI;
  3. A list of slot offset values {K1, K2, . . . KL} is configured as part of the RS set configuration such that the RS set is triggered in slots n+K1, n+K2, . . . , and n+KL; and/or
  4. Same as 3, but the list of slot offset values is indicated dynamically with a new field in DCI. In this case, the RRC configured slot offset K is either ignored, or considered as additive to the values indicated in DCI.

In a variation of this embodiment, the RS set is transmitted on a different carrier than the one in which the triggering DCI is received.

Embodiment #3 (Single Set Configured; Each RS Resource Configured with Multiple Starting Symbol Indices)

In a variation of Embodiment #1, rather than each RS resource in the set being confined to OFDM symbols within a single slot, each RS resource can be RRC configured with one or more starting OFDM symbol indices where each index can refer to an OFDM symbol in an arbitrary slot relative to the slot offset K. In a non-limiting example of this embodiment, the RRC parameter firstOFDMSymbolInTimeDomain for a CSI-RS resource can be configured with a list of values rather than a single value as in Rel-16. For example, if this parameter is configured as firstOFDMSymbolInTimeDomain={6, 6+14, 6+2*14, 6+3*14} then the corresponding CSI-RS resource is triggered in OFDM symbol 6 in slot K, K+1, K+2, and K+3. In contrast to Embodiment #1, neither L nor OLIV are signaled.

In a variation of this embodiment, the RS set is transmitted on a different carrier than the one in which the triggering DCI is received.

Embodiment #4 (Multiple Sets Configured and Triggered in Different Slots; Slot Offsets Explicitly Configured)

In this embodiment, the WD 22 is configured with N>1 RS sets where for each set the, RS resources are confined to OFDM symbols within a single slot. Each RS set is configured with its own slot offset value K (can be same or different between sets). The WD 22 is RRC configured with a list of RS set combinations, where each RS set combination consists of a list of RS set identities, IDs. The WD 22 receives a PDCCH in slot n containing a triggering DCI with a new field that contains the ID of one of the RS set combinations. In this way, RS sets are triggered in multiple slots according to the slot offset of each of the RS sets in the RS set combination.

In the illustrative example shown in Table 1 the UE configured with N=8 RS Sets with Set IDs 0, 1, 2, . . . , 7. Each of the RS Sets is configured with its own slot offset K and each RS set has one or more RS resources that are contained within a slot. The UE is configured with the following list of RS set combinations (a total of C combinations with IDs 0, 1, . . . , C−1). The DCI contains a field with at least ceil(log 2(C)) bits that is able to provide the Combination ID. For example, if DCI indices Combination ID 1, then RS Set IDs 1, 4, and 5 are triggered.

TABLE 1

| Combination ID | Combination IDs | | | |
|---|---|---|---|---|
| | RS Set ID1 | RS Set ID2 | RS Set ID3 | RS Set ID4 |
| 0 | 0 | 1 | 2 | 4 |
| 1 | 1 | 4 | 5 | Empty |
| . . . | . . . | . . . | . . . | . . . |
| C−1 | 6 | 7 | Empty | Empty |

Embodiment #5 (Multiple Sets Configured and Triggered in Different Slots; Slot Offsets Implicitly Determined)

In a variation of Embodiment #4, each RS set in an RS set combination is NOT configured with a slot offset. In this case, the number of slots in which RS sets are triggered is determined by the number of RS set IDs configured in the RS set combination. The slot offset for a particular RS set relative to slot n is implicitly determined by the position in the list of RS set IDs for the RS set combination.

In a variation of this embodiment, one or more elements of the list of RS set IDs within an RS set combination can contain a reserved value that indicates that no RS set is triggered for the slot that corresponds to that position in the list. As one non-limiting example, the reserved value can be any integer that does not correspond to a valid RS set ID, e.g., −1, 255, etc.

Embodiment #6 (Extension of Embodiments #5 and #6 to Multiple Serving Cells)

This is a variation of any of Embodiments #5 and #6, wherein a list of RS set combinations is RRC configured for each of a plurality of serving cells (carriers) and the triggering DCI contains one or more RS set combination IDs where each RS set combination ID corresponds to one or more serving cells (carriers) on which the RS sets of the indicated RS set combination are transmitted. The RRC configuration of RS set combinations for each serving cell additionally includes a parameter that indicates a bit position in the DCI field that indicates the one or more RS set combination IDs.

Embodiment #7 (Definition of Super-Set)

In a variation of any of the above embodiments, the collection of RS resources triggered in multiple slots is treated as a single super-set of RS resources for CSI determination purposes. In one non-limiting example, for CSI-RS resource sets triggered in multiple-slots, the WD 22 reports the top-N L1-RSRP values amongst the CSI-RS resources of the super-set rather than the top-N L1-RSRP values within an individual constituent RS set.

Embodiment #8 (Reference Numerology for Slot Offset)

In a variation of any of the above embodiments, for the case when the PDCCH containing the triggering DCI is received on a first carrier in slot n, and the triggered RS sets are received on a second carrier, and the first and second carriers have different numerologies, the slot offset K (whether explicitly indicates or implicitly determined) with respect to slot n is equal to a number of slots in a reference numerology. The reference numerology is one of the following two alternatives: (1) numerology used on the first carrier, or (2) numerology used on the second carrier.

Embodiment #9 (Indication of Beam Repetition for CSI-RS Resources in Multiple Slots)

In a variation of any of the above embodiments for the case when the triggered RS set(s) are CSI-RS resource sets, the WD 22 can be configured with a plurality of beam repetition indicator (BRI) values, wherein each CSI-RS resource across the multiple slots is associated with a particular BRI value from the plurality of BRI values. If the WD 22 is configured with the same BRI value for two or more CSI-RS resources, it may assume that those CSI-RS resources are transmitted with the same downlink spatial domain transmission filter (beam forming weights), thus allowing the WD 22 to adjust its spatial domain reception filter when performing measurements on those CSI-RS resources.

In one non-limiting example, the BRI values consist of a list of integers, and different integer values correspond to different downlink spatial domain transmission filters.

In another non-limiting example, the WD 22 may be configured with a bitmap of length equal to the number of CSI-RS resources across the multiple slots, and the BRI values are binary (0 or 1). A string of 1's or 0's in a row indicates the that WD 22 can assume the same downlink spatial domain transmission filter is used for the corresponding CSI-RS resources, e.g., for a case with 8 resources transmitted in one or more slots, the bitmap could be configured as 11100111. Whenever a '1' changes to a '0' or vice versa, the WD 22 may not assume that the same downlink spatial domain transmission filter is used for the corresponding two CSI-RS resources. In a variation of this embodiment, run-length encoding is used instead wherein a list of integers indicates the number of consecutive resources for which the WD 22 may assume the same downlink spatial domain transmission filter is used. For the same example of 8 resources, the list of integers would be {3 2 3}.

In a variation of this embodiment, the configuration of BRI values overrides the repetition parameter configured in each of the triggered CSI-RS resource sets.

According to one aspect, a network node 16 is configured to communicate with a wireless device (WD) 22. The network node 16 comprises a radio interface 62 and/or comprising processing circuitry 68 configured to configure a WD 22 with a set of reference signals via a single downlink control information, DCI, signal, and trigger the WD 22 to transmit the set of reference signals in time slots indicated by an offset.

According to this aspect, in some embodiments, the time slots are consecutive. In some embodiments, an initial one of the time slots is indicated by an orthogonal frequency division multiplexed, OFDM, symbol index. In some embodiments, the network node 16, radio interface 62 and/or processing circuitry 68 is further configured to configure the WD with multiple sets of reference signals. In some embodiments, a number of the time slots is configured for the set of reference signals. In some embodiments, a set of reference signals is configured for each of a plurality of cells. In some embodiments, the network node 16, radio interface 62 and/or processing circuitry 68 are further configured to configure the WD to report a number of reference signal received power values corresponding to the set of reference signals. In some embodiments, the DCI is sent on a first carrier and triggered reference signal transmissions are received on a second carrier. In some embodiments, the network node 16, radio interface 62 and/or processing circuitry 68 are further configured to configure the WD with a plurality of beam repetition indicator, BRI, values.

According to another aspect, a method implemented in a network node 16 includes configuring, via processing circuitry 68, a WD 22 with a set of reference signals via a single downlink control information, DCI, signal, and triggering the WD 22 to transmit the set of reference signals in time slots indicated by an offset.

According to this aspect, in some embodiments, the time slots are consecutive. In some embodiments, an initial one of the time slots is indicated by an orthogonal frequency division multiplexed, OFDM, symbol index. In some embodiments, the method further includes configuring the WD with multiple sets of reference signals. In some embodiments, a number of the time slots is configured for the set of reference signals. In some embodiments, a set of reference signals is configured for each of a plurality of cells. In some embodiments, the method further includes configuring, via the processing circuitry 68, the WD to report a number of reference signal received power values corresponding to the set of reference signals. In some embodiments, the DCI is sent on a first carrier and triggered reference signal transmissions are received on a second carrier. In some embodiments, the method further includes configuring the WD with a plurality of beam repetition indicator, BRI, values.

According to yet another aspect, a WD 22 configured to communicate with a network node. The WD includes a radio interface 82 and/or comprising processing circuitry 84 configured to receive, from the network node, an indication of a set of reference signals via a single downlink control information, DCI, signal, and transmit the set of reference signals in time slots indicated by an offset based on a trigger received from the network node.

According to this aspect, in some embodiments, the time slots are consecutive. In some embodiments, an initial one of the time slots is indicated by an orthogonal frequency division multiplexed, OFDM, symbol index. In some embodiments, the WD 22, radio interface 82 and/or processing circuitry 84 is further configured to receive multiple sets of reference signals. In some embodiments, the WD 22, radio interface 82 and/or processing circuitry 84 are further configured to report a number of reference signal received power values corresponding to the set of reference signals.

According to another aspect, a method implemented in a wireless device, WD 22, includes receiving, from the network node 16, an indication of a set of reference signals via a single downlink control information, DCI, signal, and transmitting the set of reference signals in time slots indicated by an offset based on a trigger received from the network node.

According to this aspect, in some embodiments, the time slots are consecutive. In some embodiments, an initial one of the time slots is indicated by an orthogonal frequency division multiplexed, OFDM, symbol index. In some embodiments, the method further includes receiving multiple sets of reference signals. In some embodiments, the method further includes reporting a number of reference signal received power values corresponding to the set of reference signals. In some embodiments the reference signal is a Channel-State Information Reference Signal, CSI-RS, or a Sounding Reference Signal, SRS.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

EMBODIMENTS

Embodiment A1. A network node configured to communicate with a wireless device (WD), the network node configured to, and/or comprising a radio interface and/or comprising processing circuitry configured to:
configure a WD with a set of reference signals via a single downlink control information, DCI, signal; and
trigger the WD to transmit the set of reference signals in time slots indicated by an offset.

Embodiment A2. The network node of Embodiment A1, wherein the time slots are consecutive.

Embodiment A3. The network node of Embodiment A1, wherein an initial one of the time slots is indicated by an orthogonal frequency division multiplexed, OFDM, symbol index.

Embodiment A4. The network node of Embodiment A1, wherein the network node, radio interface and/or processing circuitry is further configured to configure the WD with multiple sets of reference signals.

Embodiment A5. The network node of Embodiment A1, wherein a number of the time slots is configured for the set of reference signals.

Embodiment A6. The network node of Embodiment A1, wherein a set of reference signals is configured for each of a plurality of cells.

Embodiment A7. The network node of Embodiment A1, wherein the network node, radio interface and/or processing circuitry are further configured to configure the WD to report a number of reference signal received power values corresponding to the set of reference signals.

Embodiment A8. The network node of Embodiment A1, wherein the DCI is sent on a first carrier and triggered reference signal transmissions are received on a second carrier.

Embodiment A9. The network node of Embodiment A1, wherein the network node, radio interface and/or processing circuitry are further configured to configure the WD with a plurality of beam repetition indicator, BRI, values.

Embodiment B1. A method implemented in a network node, the method comprising:
configuring a WD with a set of reference signals via a single downlink control information, DCI, signal; and
triggering the WD to transmit the set of reference signals in time slots indicated by an offset.

Embodiment B2. The method of Embodiment B1, wherein the time slots are consecutive.

Embodiment B3. The method of Embodiment B1, wherein an initial one of the time slots is indicated by an orthogonal frequency division multiplexed, OFDM, symbol index.

Embodiment B4. The method of Embodiment B1, further comprising configuring the WD with multiple sets of reference signals.

Embodiment B5. The method of Embodiment B1, wherein a number of the time slots is configured for the set of reference signals.

Embodiment B6. The method of Embodiment B1, wherein a set of reference signals is configured for each of a plurality of cells.

Embodiment B7. The method of Embodiment B1, further comprising configuring the WD to report a number of reference signal received power values corresponding to the set of reference signals.

Embodiment B8. The method of Embodiment B1, wherein the DCI is sent on a first carrier and triggered reference signal transmissions are received on a second carrier.

Embodiment B9. The method of Embodiment B1, further comprising configuring the WD with a plurality of beam repetition indicator, BRI, values.

Embodiment C1. A wireless device (WD) configured to communicate with a network node, the WD configured to, and/or comprising a radio interface and/or comprising processing circuitry configured to:
receive, from the network node, an indication of a set of reference signals via a single downlink control information, DCI, signal; and
transmit the set of reference signals in time slots indicated by an offset based on a trigger received from the network node.

Embodiment C2. The WD of Embodiment C1, wherein the time slots are consecutive.

Embodiment C3. The WD of Embodiment C1, wherein an initial one of the time slots is indicated by an orthogonal frequency division multiplexed, OFDM, symbol index.

Embodiment C4. The WD of Embodiment C1, wherein the WD, radio interface and/or processing circuitry is further configured to receive multiple sets of reference signals.

Embodiment C5. The WD of Embodiment C1, wherein the WD, radio interface and/or processing circuitry are further configured to report a number of reference signal received power values corresponding to the set of reference signals.

Embodiment D1. A method implemented in a wireless device, WD, the method comprising:
receiving, from the network node, an indication of a set of reference signals via a single downlink control information, DCI, signal; and
transmitting the set of reference signals in time slots indicated by an offset based on a trigger received from the network node.

Embodiment D2. The method of Embodiment D1, wherein the time slots are consecutive.

Embodiment D3. The method of Embodiment D1, wherein an initial one of the time slots is indicated by an orthogonal frequency division multiplexed, OFDM, symbol index.

Embodiment D4. The method of Embodiment D1, further comprising receiving multiple sets of reference signals.

Embodiment D5. The method of Embodiment D1, further comprising reporting a number of reference signal received power values corresponding to the set of reference signals.

The invention claimed is:
1. A network node configured to communicate with a wireless device (WD), the network node comprising a radio interface and processing circuitry configured to:

transmit, to the wireless device, a configuration of sets of reference signals via radio resource control (RRC) signaling; and transmit, to the wireless device, a downlink control information, DCI, that triggers the sets of reference signals (RS) in multiple slots, each set of reference signals being confined to orthogonal frequency division multiplexed (OFDM) symbols within a slot, the number of slots in which sets of reference signal are triggered being determined by a number of RS set IDs configured in a reference signal set combination ID.

2. The network node of claim 1, wherein the DCI comprises a field which indicates a reference signal set combination ID, which identifies a combination of sets of reference signals.

3. The network node of claim 2, wherein the combination of the set of reference signals is identified using identities, RS set IDs, which identifies the sets of reference signals in the combination of the set of reference signals.

4. The network node of claim 3, wherein the reference signal set combination ID indicates a list of RS set IDs.

5. The network node of claim 1, wherein the RRC signaling configures the UE with a list of reference signal set combination IDs.

6. The network node of claim 1, wherein the RRC signaling configures each set of reference signals with a slot offset value.

7. The network node of claim 1, wherein the slot offset for a particular set of reference signals relative to slot n is determined by the position in the list of RS set IDs for the combination of sets of reference signals.

8. The network node of claim 1, wherein the DCI triggers the sets of reference signals in multiple slots according to the slot offset of each of the set of reference signals in the combination of the set of reference signals.

9. The network node of claim 1, wherein the DCI that triggers a collection of channel state information reference signal (CSI-RS) sets triggered in multiple-slots further indicates to the wireless device to report the top-N measurement values amongst the CSI-RS resource sets collection.

10. The network node of claim 1, wherein if the triggered reference signal sets are channel state information reference signal (CSI-RS) sets, the wireless device is configured with a plurality of beam repetition indicator, BRI, values, wherein each CSI-RS resource across the multiple slots is associated with a particular BRI value from the plurality of BRI values.

11. The network node of claim 10, wherein if UE is configured with the same BRI value for two or more CSI-RS resources, the UE assumes the CSI-RS resources are transmitted with the same downlink spatial domain transmission filter such that the UE can adjust the spatial domain reception filter when performing measurements on the CSI-RS resources.

12. A wireless device (WD) configured to communicate with a network node, the WD comprising a radio interface and processing circuitry configured to:

receive, from the network node, a configuration of sets of reference signals, RSs, via radio resource control (RRC) signaling;

receive, from the network node, a triggering of the set of reference signals via a downlink control information, DCI, wherein the DCI triggers reference signal in multiple slots, a number of slots in which sets of reference signals are triggered being determined by a number of RS set IDs configured in a reference signal set combination ID; and at least one of transmit or receive the set of reference signals in multiple slots as indicated by the information received from the network node; wherein each set of reference signals is confined to orthogonal frequency division multiplexed (OFDM symbols within a slot.

13. The wireless device of claim 12, wherein the RRC signaling configures the UE with a list of reference signal set combination IDs.

14. The wireless device of claim 13, wherein the DCI that triggers a collection of channel state information, CSI, RS sets triggered in multiple-slots-further indicate to the wireless device to report the top-N measurement values amongst the CSI-RS resource set of collection.

15. The wireless device of claim 12, wherein a slot offset for a particular set of reference signals relative to slot n is determined by the position in the list of RS set IDs for the combination of sets of reference signals.

16. The wireless device of claim 12, wherein the DCI triggers the sets of reference signals in multiple slots according to the slot offset of each of the set of reference signals in the combination of the set of reference signals.

17. The wireless device of claim 12, wherein if the triggered reference signal sets are channel state information reference signal (CSI-RS) sets, the wireless device is configured with a plurality of beam repetition indicator, BRI, values, wherein each CSI-RS resource across the multiple slots is associated with a particular BRI value from the plurality of BRI values.

18. The wireless device of claim 17, wherein when two consecutive BRI values are different, the wireless device determines to adjust its spatial domain reception filter.

19. A method implemented in a wireless device, WD, configured to communicate with a network node, the method comprising:

receiving, from the network node, a configuration of sets of reference signals via radio resource control (RRC) signaling;

receiving, from the network node, a trigger of the set of reference signals via a downlink control information, DCI, a number of slots in which sets of reference signals are triggered being determined by a number of RS set IDs configured in a reference signal set combination ID; and at least one of transmitting or receiving the set of reference signals in multiple slots as indicated by the information received from the network node; wherein each set of reference signals is confined to OFDM symbols within a slot.

* * * * *